(12) United States Patent
Menke (10) Patent No.: US 7,786,608 B2
(45) Date of Patent: Aug. 31, 2010

(54) PROTECTION SYSTEM FOR WIND TURBINE

(75) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 12/272,219

(22) Filed: Nov. 17, 2008

(65) Prior Publication Data
US 2010/0123314 A1 May 20, 2010

(51) Int. Cl.
*H02P 9/00* (2006.01)
*H02P 9/48* (2006.01)

(52) U.S. Cl. .............................. 290/44; 290/55; 322/29

(58) Field of Classification Search .................. 290/43, 290/44, 54, 55; 322/37, 29
See application file for complete search history.

(56) References Cited

U.S. PATENT DOCUMENTS

| | | | | |
|---|---|---|---|---|
| 5,907,192 A * | 5/1999 | Lyons et al. | ................... | 290/44 |
| 6,774,608 B2 * | 8/2004 | Hofstetter et al. | ............. | 322/24 |
| 7,015,595 B2 * | 3/2006 | Feddersen et al. | ............. | 290/44 |
| 7,102,247 B2 * | 9/2006 | Feddersen | .................... | 290/44 |
| 7,239,036 B2 * | 7/2007 | D'Atre et al. | ................. | 290/44 |
| 7,253,537 B2 * | 8/2007 | Weng et al. | .................... | 290/44 |
| 7,276,807 B2 * | 10/2007 | Luetze et al. | ................. | 290/44 |
| 7,397,145 B2 | 7/2008 | Struve et al. | | |
| 7,425,771 B2 * | 9/2008 | Rivas et al. | .................... | 290/44 |
| 7,622,815 B2 * | 11/2009 | Rivas et al. | .................... | 290/44 |
| 2007/0085344 A1 | 4/2007 | Janssen et al. | | |
| 2007/0116572 A1 | 5/2007 | Barbu et al. | | |
| 2007/0189900 A1 | 8/2007 | Rogall et al. | | |

FOREIGN PATENT DOCUMENTS

| | | |
|---|---|---|
| EP | 1788237 A2 | 5/2007 |
| WO | 2006010377 A1 | 2/2006 |
| WO | 2007135573 A2 | 11/2007 |

OTHER PUBLICATIONS

US 7,355,295, 04/2008, Rivas et al. (withdrawn)

* cited by examiner

*Primary Examiner*—Nicholas Ponomarenko
(74) *Attorney, Agent, or Firm*—James W. Pemrick; Ernest G. Cusick; Frank A. Landgraff (57) ABSTRACT

A braking system for a wind turbine is provided, and the wind turbine includes a rotor having at least one blade. A generator includes a plurality of stator windings having a plurality of phases. The braking system includes a plurality of resistors, and at least one switch connected between the stator windings and the resistors. The switch can be configured to connect the stator windings to each other via the resistors, for the effect of slowing down or stopping the rotor of the wind turbine.

16 Claims, 6 Drawing Sheets

PROTECTION SYSTEM FOR WIND TURBINE

BACKGROUND OF THE INVENTION

This invention relates generally to wind turbines, and more particularly to a system for protecting the wind turbine during shut down or emergency stop.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is then fed into a utility grid.

Wind turbines require redundant braking systems in order to satisfy safety requirements. A first brake system conventionally uses aerodynamic braking to pitch the turbine blades into a feathered position and includes a stored energy source so that blade pitch can occur after a loss of power in a utility grid. A second brake system conventionally includes a disk brake not capable of stopping a turbine against full wind torque. Blade pitch has been accomplished on commercial wind turbines with a hydraulic ram and rotating coupling arrangement that can be readily backed up with a hydraulic accumulator, or an electrical DC system with a battery backup and DC motors. A third brake solution is the movement of the blades out of the wind by yaw activation (e.g., 90°. However, all of these known braking systems have been known to fail, and catastrophic damage, in some cases, has occurred to the wind turbine.

BRIEF DESCRIPTION OF THE INVENTION

One aspect of the present invention therefore provides a braking system for a wind turbine. The wind turbine includes a rotor having at least one blade. A generator includes a plurality of stator windings having a plurality of phases. The braking system includes a plurality of resistors, and at least one switch connected between the stator windings and the resistors. The switch can be configured to connect the stator windings to each other via the resistors, for the effect of slowing down or stopping the rotor of the wind turbine.

Another aspect of the present invention provides a braking system for a wind turbine. The wind turbine includes a rotor having at least one blade, and a generator having a plurality of stator windings with a plurality of phases. The braking system includes a stator winding short-circuiting system having at least one switch connected between a plurality of stator windings and the stator winding short-circuiting system. The switch can be configured to connect the stator windings to each other via the stator winding short-circuiting system, for the effect of slowing down the rotor of the wind turbine.

A still further aspect of the present invention provides a braking system for a wind turbine. The wind turbine includes a rotor having at least one blade, and a generator having a plurality of stator windings with a plurality of phases. The braking system includes at least one switch connected between the stator windings. The switch can be configured to connect the stator windings to each other for the effect of reducing the speed of the rotor of the wind turbine.

DETAILED DESCRIPTION OF THE INVENTION

Figure 1:
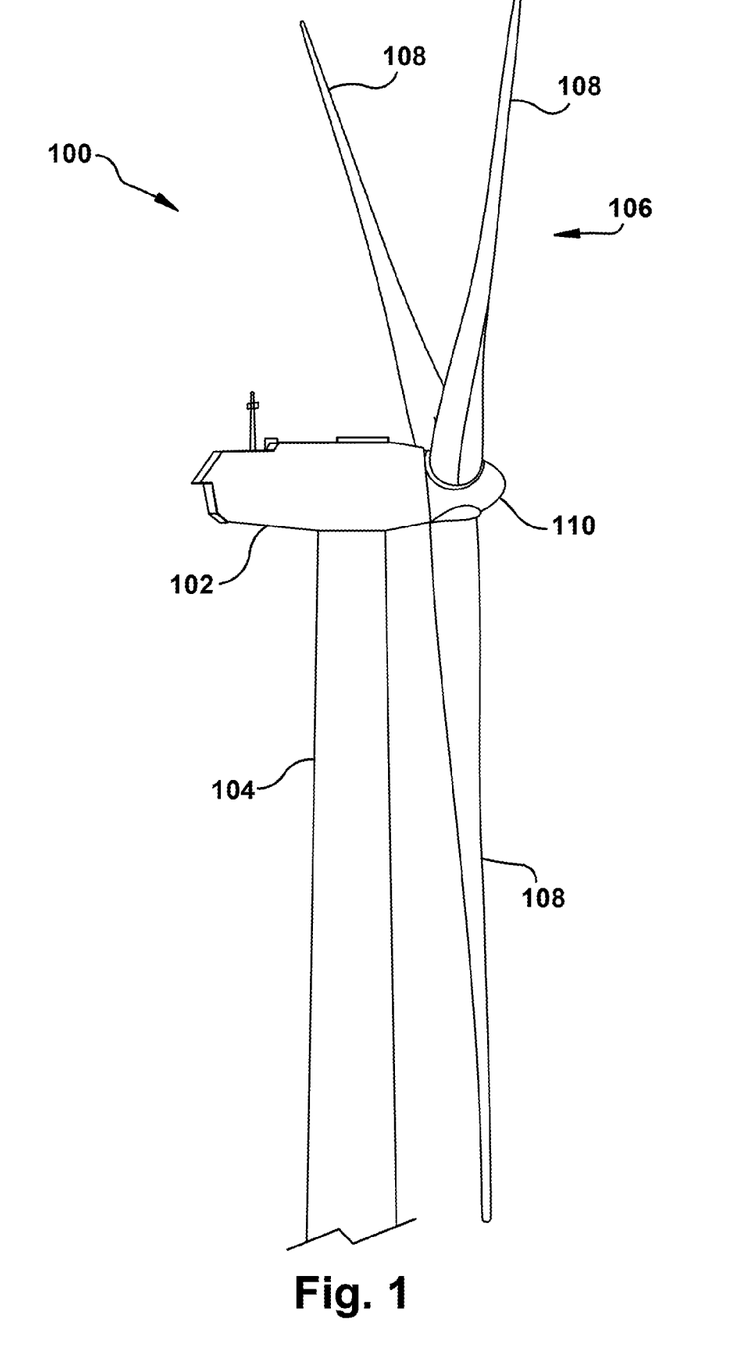
FIG. 1 is an illustration of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
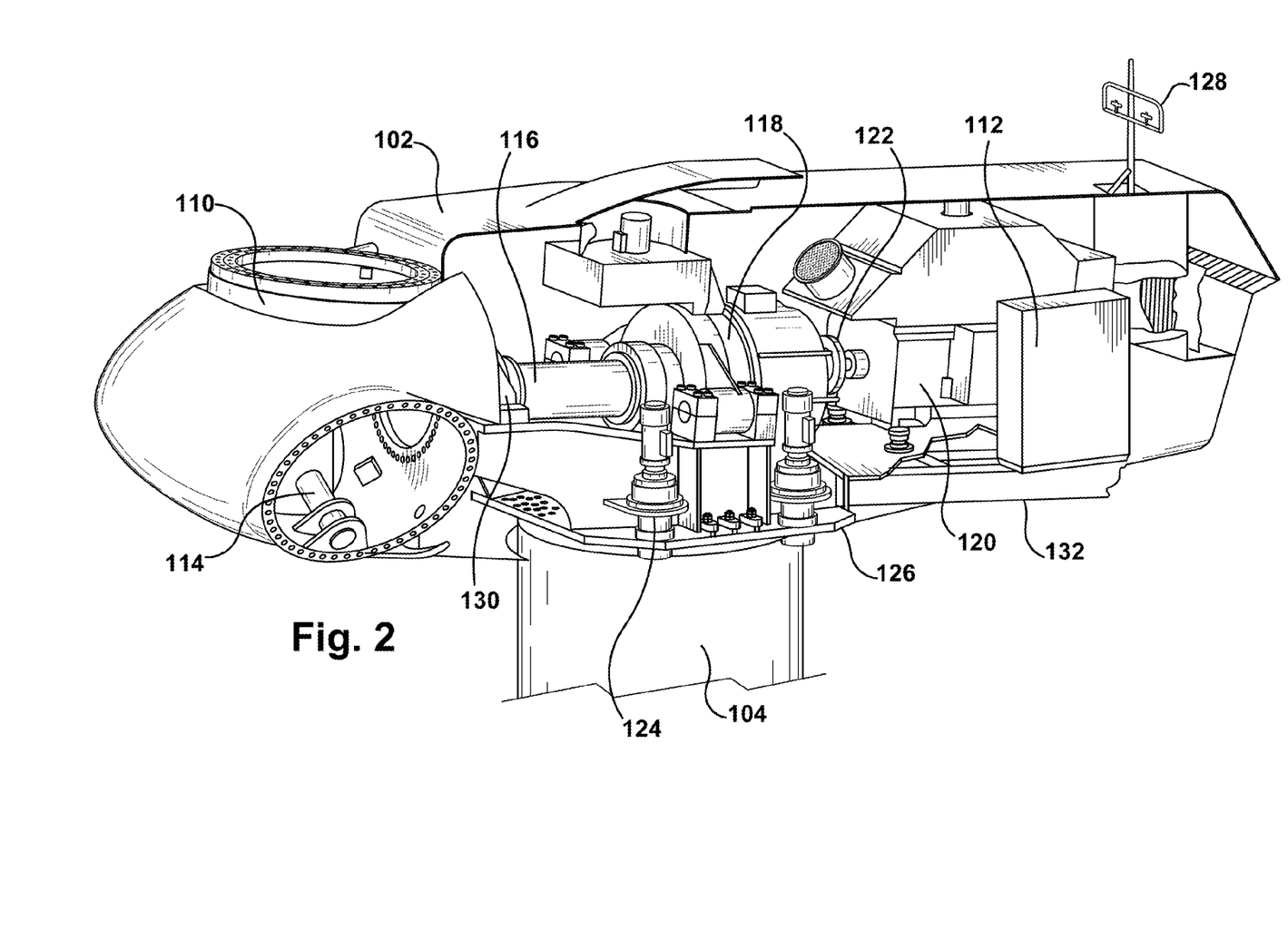
FIG. 2 is a cut-away perspective illustration of a nacelle of the exemplary wind turbine configuration shown in FIG. 1 and including a known geared drivetrain.

In some configurations and referring to FIG. 2, various components are housed in nacelle 102 atop tower 104 of wind turbine 100. The height of tower 104 is selected based upon factors and conditions known in the art. In some configurations, one or more microcontrollers/processors within control panel 112 comprise a control system used for overall system monitoring and control. In alternative embodiments, the control panel 112 may be located in the tower 104 or remotely from wind turbine 100. Alternative distributed or centralized control architectures are used in some configurations.

In some configurations, a variable blade pitch drive 114 is provided to control the pitch of blades 108 (not shown in FIG. 2) that drive hub 110 as a result of wind. In some configurations, the pitch angles of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 132. In some configurations, rotor torque is transmitted via coupling 122. In some configurations of the present invention, generator 120 is a permanent magnet generator. This invention is adaptable for synchronous generators with electrical exciters as well, and is independent on direct drive (i.e., no gearbox) or wind turbines with a gearbox.

Yaw drive 124 and yaw deck 126 provide a yaw orientation system for wind turbine 100. A meteorological boom 128 provides information for a turbine control system, which may include wind direction and/or wind speed. In some configurations, the yaw system is mounted on a flange provided atop tower 104.

Figure 3:
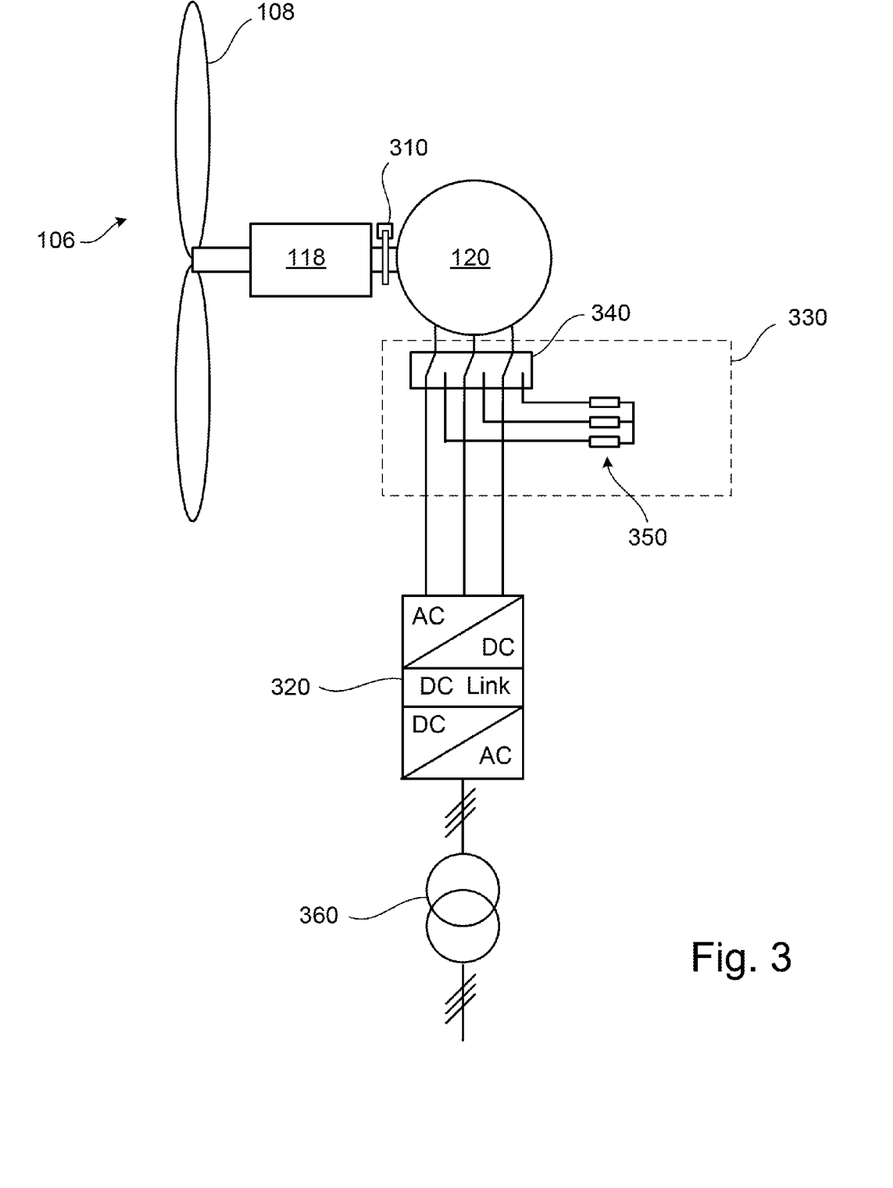
FIG. 3 is a simplified schematic illustration of an auxiliary braking system that can be used with the wind turbine of FIG. 1, according to one aspect of the present invention.

FIG. 3 illustrates a simplified schematic of a power conversion system that may be used in conjunction with wind turbine 100, according to an aspect of the present invention. A braking system 310 is usually comprised of a disc and caliper arrangement, and is used to stop rotation of rotor 106. The braking system 310 can be positioned on the low speed shaft, high speed shaft or on the generator. Known systems have relied on pitch drive 114, frequency converter 320, and brake 310, to assist in braking or stopping the rotor 106. The frequency converter 320 can aid in the shut down procedure by taking torque from generator 120 and feeding it into the power grid via transformer 360, assuming the grid is available to absorb this energy. However, it has been known that these systems can fail or the grid can be down, and the rotor 106 operates in a "runaway" condition. This "runaway" condition is potentially dangerous to the wind turbine, and has been known to result in catastrophic failures. It would be beneficial if a more reliable braking system was available for added safety and reliability.

According to aspects of the present invention, an auxiliary braking system 330 can be connected between the generator 120 and frequency converter 320. The generator 120 can be used as a driver to decelerate the rotor speed. The PM generator 120 generates electrical power without an electrical exciter if it rotates. If the generator 120 is on speed and the windings are connected together (e.g., short circuit the stator windings), then a torque is generated that depends on the current that flows.

The auxiliary braking system 330 includes a power contactor switch 340 that connects all stator windings of the generator 120 over external resistors 350. In alternative embodiments, the resistors 350 could be configured as one or more shunts. The resistors 350 limit the current that flows through the stator windings. The current depends on the resistor value and the voltage that the generator 120 generates. In effect, the stator windings of the permanent magnet generator 120 can be short-circuited by the closing of switches 340. The switches 340 can be controlled by one or more microcontrollers within control panel 112, or by any other suitable control means.

In the non-braking mode, switch 340 is configured so that power is transmitted to frequency converter 320. This corresponds to a normal power producing state for the wind turbine 100. When switch 340 is changed to short circuit the stator windings through resistors 350, current flows through the stator windings in a manner to, provide dynamic braking.

Figure 4:
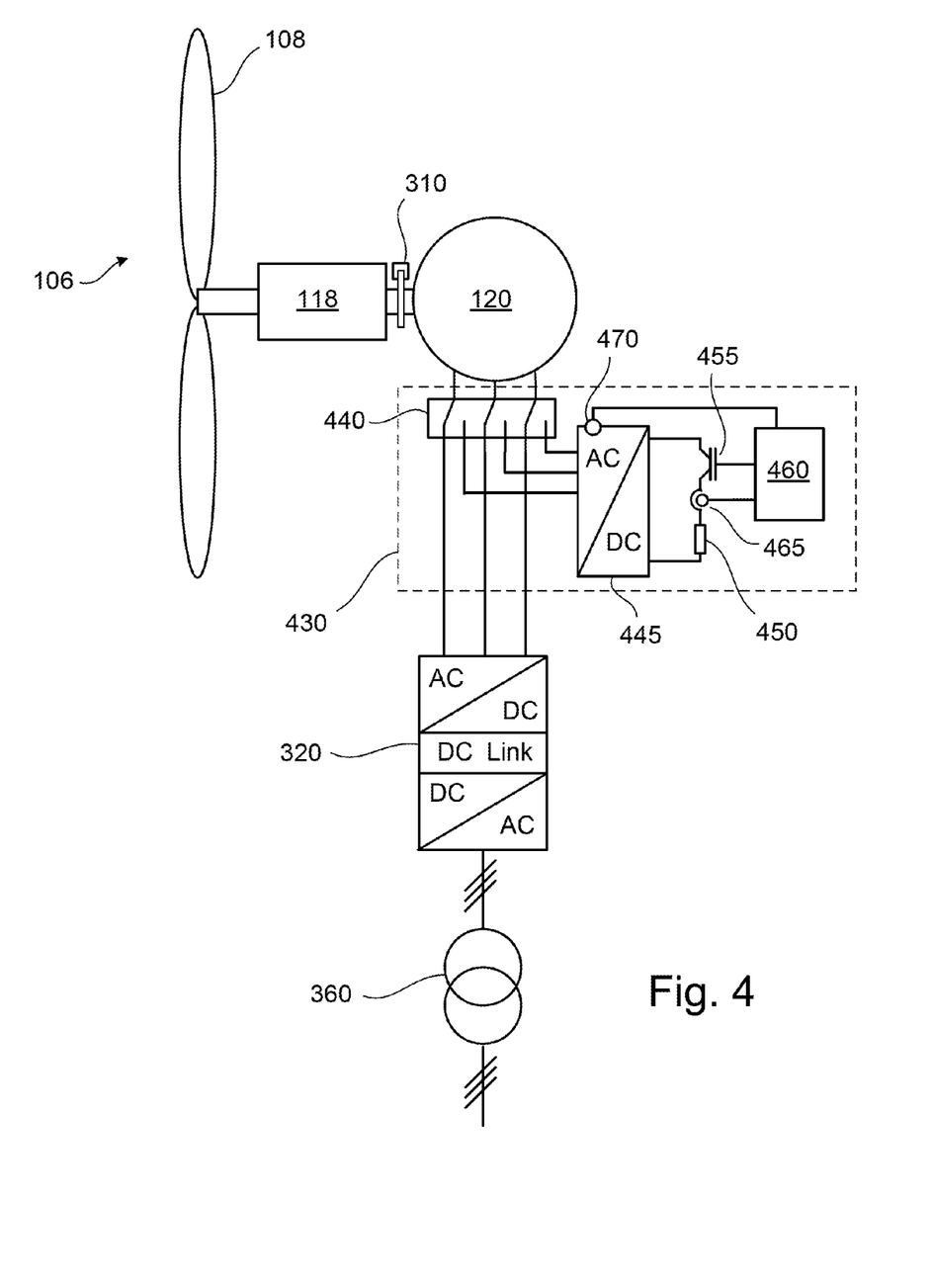
FIG. 4 is a simplified schematic illustration of an auxiliary braking system that can be used with the wind turbine of FIG. 1, according to another aspect of the present invention.

FIG. 4 illustrates a simplified schematic of a power conversion system that may be used in conjunction with wind turbine 100, according to another aspect of the present invention. This is a microcontroller-based system that reads in the actual current and the rotating speed of the generator 120 and controls the torque by a switching device.

The auxiliary braking system 430 includes power contactor switch 440, an AC/DC converter 445, resistor or shunt 450, a transistor 455, a controller 460, a current sensor 465, and a speed sensor 470. The transistor 455 could be any suitable switching device, including but not limited to, an insulated gate bipolar transistor (IGBT). One transistor 455 is shown in FIG. 4, however, it is to be understood that multiple transistors (in parallel and/or series) could be used as well.

The power contactor switch 440 can connect the generator 120 to the AC/DC converter 445. The switch 440 can be controlled by one or more microcontrollers within control panel 112, or by any other suitable control means. The AC/DC converter 445 converts the AC voltage from the generator 120 into DC voltage. The controller 460 measures the speed by the speed sensor 470 and calculates the current that must flow over the resistor 450 to follow the desired torque characteristic curve. The torque characteristic curve can be stored in the controller 460 or in other internal or external memory (not shown), and the torque characteristic curve can be defined by desired load limits.

Figure 5:
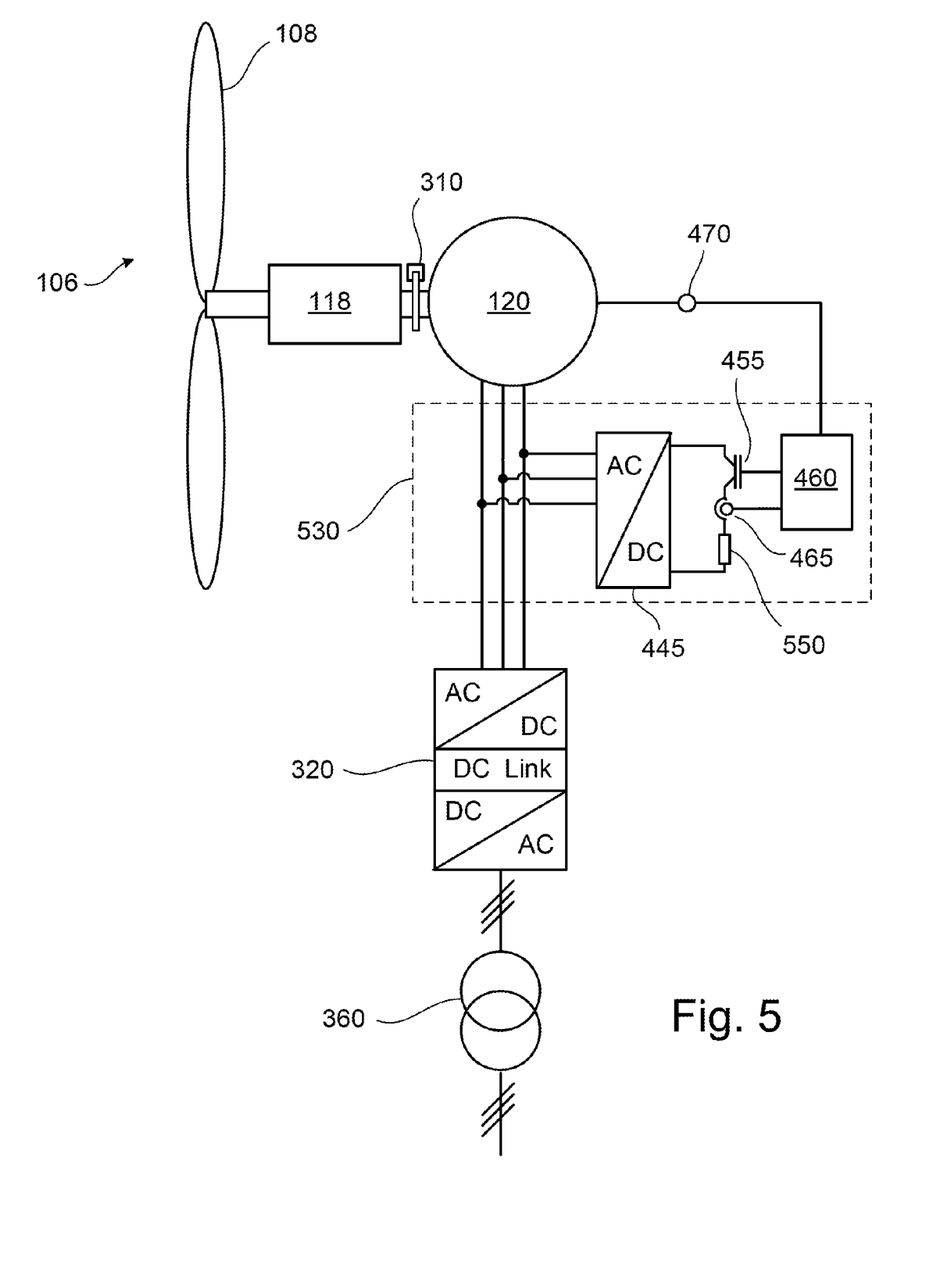
FIG. 5 is a simplified schematic illustration of an auxiliary braking system that can be used with the wind turbine of FIG. 1, according to yet another aspect of the present invention.

FIG. 5 illustrates a simplified schematic of a power conversion system that may be used in conjunction with wind turbine 100, according to yet another aspect of the present invention. This embodiment illustrates a generator based brake system, and can be used with synchronous generators having a permanent exciter (PSM) or an electrical exciter.

The auxiliary braking system 530 includes an AC/DC converter 445, resistor or shunt 550, a transistor 455, a controller 460, a current sensor 465, and a speed sensor 470. The transistor 455 could be any suitable switching device, including but not limited to, an insulated gate bipolar transistor (IGBT). One transistor 455 is shown in FIG. 5, however, it is to be understood that multiple transistors (in parallel and/or series) could be used as well. The resistor or shunt 550 can comprise one or more devices connected in parallel or series.

The transistor 455 can be controlled by controller 460, or by any other suitable control means. The AC/DC converter 445 converts the AC voltage from the generator 120 into DC voltage. The controller 460 measures the speed by the speed sensor 470 and calculates the current that must flow over the resistor or shunt 550 to follow the desired torque characteristic curve. The torque characteristic curve can be stored in the controller 460 or in other internal or external memory (not shown), and the torque characteristic curve can be defined by desired load limits. In addition, controller 460 can measure the rotation speed of generator 120 via speed sensor 470, and can activate a braking process if an over-speed condition occurs. In alternative embodiments, the speed and/or temperature of the generator 120 or other components of wind turbine 100 could be monitored and used by controller 460 to activate a braking process. The speed sensor 470 can be an incremental sensor, absolute encoder, voltage frequency sensor connected to a stator winding, or any other suitable sensor.

Figure 6:
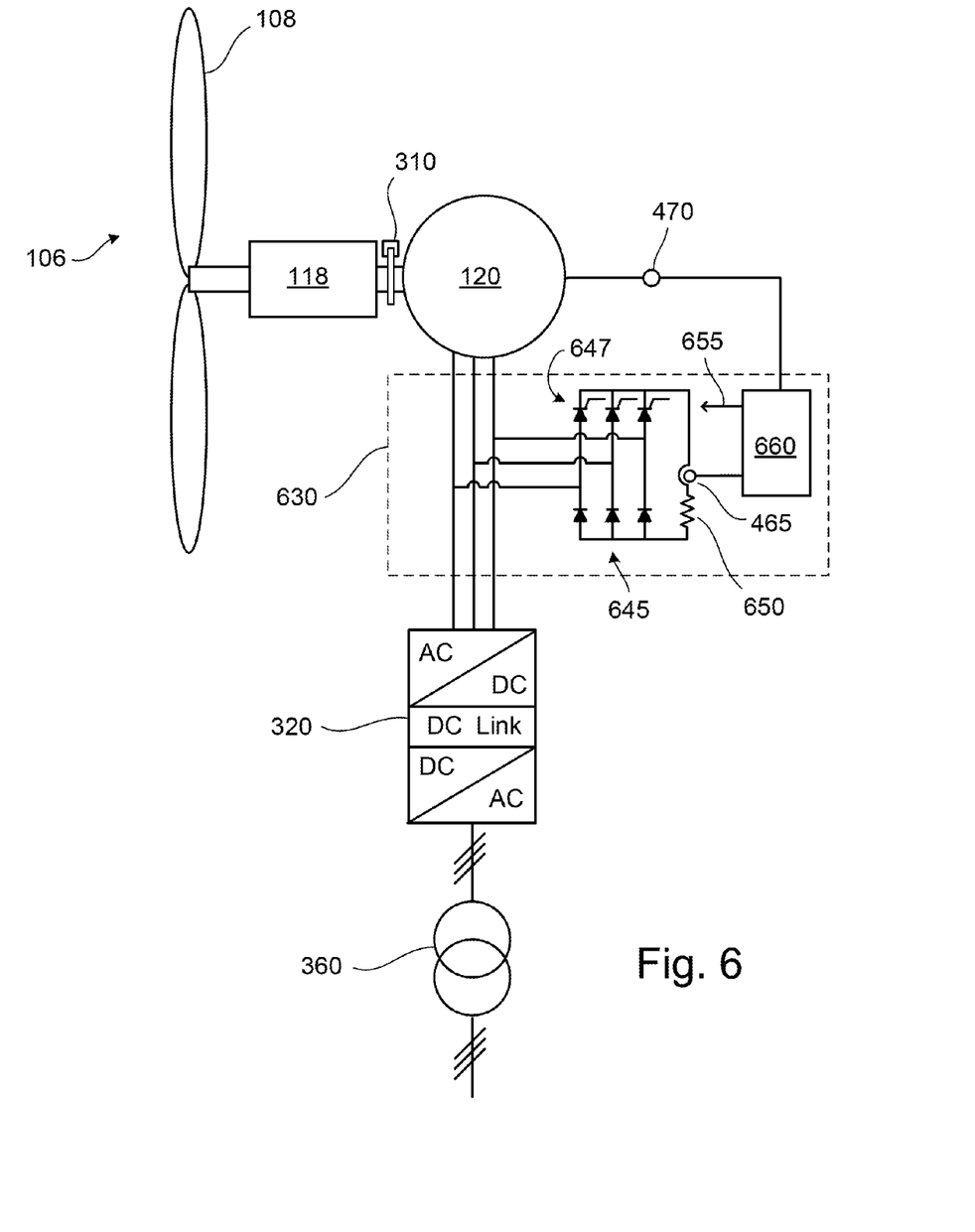
FIG. 6 is a simplified schematic illustration of an auxiliary braking system that can be used with the wind turbine of FIG. 1, according to a still further aspect of the present invention

FIG. 6 illustrates a simplified schematic of a power conversion system that incorporates a rectifying circuit. The auxiliary braking system 630 includes a rectifying circuit comprised of diodes 645 and thyristors 647, as well as resistor or shunt 650, a controller 660, current sensor 465, and a speed sensor 470. The rectifying circuit could be comprised of all or combinations of diodes, thyristors, silicon controlled rectifiers (SCRs) and any other suitable device. As one example only, the rectifying circuit could be comprised of six thyristors. Controller 660 can control the thyristors 647 via control signal 655. In this manner the controller 660 can selectively activate the braking system 630. The resistor or shunt 650 can also comprise one or more devices connected in parallel or series.

The embodiments shown in FIGS. 4 and 5 can be implemented with or without switch 440. One or more shunts or resistors, or combinations thereof, can be used for elements 450 and 550. The AC/DC converter 445 could also be implemented by any three phase rectifying device, bridge circuit or any other suitable rectifying device or circuit. The braking system herein described can be an independent system, and may not require any external or remote activation. In one example, the controller 460 acts on its own to activate the braking system.

The controller 460 regulates the current/torque over the resistor 450 by the current sensor 465 and the transistor 455. With this system it is possible to drive preferred torque curves to stop the turbine without damaging any turbine components. The auxiliary braking systems described herein provide an independent braking system that is independent from the frequency converter and the grid voltage. The rotating generator provides the energy required by the auxiliary braking system.

The controller 460 comprises any appropriate high-powered solid-state switching or computing device. As illustrated, the controller 460 is represented as a micro-computer or micro-processor. However, this is merely exemplary of an appropriate high-powered control, which is within the scope of the invention. For example but not limiting of the invention, the controller 460 can comprise at least one of a silicon controlled rectifier (SCR), a thyristor, MOS-controlled thyristor (MCT), insulated gate field effect device (FET) and an insulated gate bipolar transistor (IGBT). In the illustrated embodiment, the control is implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control can also be implemented using a variety of separate dedicated or programmable integrated or other electronic circuits or devices, such as hardwired electronic or logic circuits including discrete element circuits or programmable logic devices, such as PLDs, PALs, PLAs or the like. The control can also be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the flow charts, as illustrated in the application, can be used as the control.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits. The technical effect of the computer program code is to evaluate and calculate the desired operational characteristics needed to slow down and/or stop the generator 120 and/or rotor 106.

While the invention has been described in terms of various specific embodiments, those skilled in the art will recognize that the invention can be practiced with modification within the spirit and scope of the claims.

What is claimed is:

1. A braking system for a wind turbine, said wind turbine comprising a rotor, said rotor comprising at least one blade, said braking system comprising:
    a generator comprising a plurality of stator windings; said plurality of stator windings comprising a plurality of phases;
    a plurality of resistors;
    at least one switch located between said plurality of stator windings and said plurality of resistors;
    the braking system connected at a first input to the generator, and connected at a first output to a frequency converter;
    wherein said at least one switch can be configured to connect said plurality of stator windings to each other via said plurality of resistors while isolating the frequency converter from the generator, for slowing down movement or rotation of said rotor of said wind turbine.

2. The braking system of claim 1, wherein said braking system is connected to said generator and said frequency converter, so that in a first mode of operation the braking system passes energy generated by the generator to the frequency converter, and in a second mode of operation the braking system isolates the frequency converter from the generator.

3. The braking system of claim 1, wherein said plurality of resistors limit current flowing through said plurality of stator windings.

4. The braking system of claim 1, further comprising a control system, wherein said at least one switch is controlled by the control system.

5. A braking system for a wind turbine, the wind turbine comprising a rotor, having at least one blade, a generator having a plurality of stator windings, the plurality of stator windings comprising a plurality of phases, and a frequency converter, the braking system comprising:
    at least one current limiting device;
    at least one switch connected to the frequency converter and between the plurality of stator windings of the generator and the at least one current limiting device, the at least one switch configurable in a first mode and a second mode, the first mode allowing power to flow from the generator to the frequency converter while isolating the at least one current limiting device from the generator and frequency converter, the second mode isolating the frequency converter from the generator;
    wherein the braking system connects the plurality of stator windings to each other via the at least one current limiting device when the at least one switch is configured in the second mode, for slowing down movement or rotation of the rotor of the wind turbine.

6. The braking system of claim 5, further comprising a control system, wherein the at least one switch is controlled by the control system.

7. The braking system of claim 5, wherein the at least one current limiting device is at least one resistor.

8. The braking system of claim 7, further comprising:
    an AC/DC converter;
    a current sensor;
    a switching device;
    a control device;
    wherein, the control device controls the switching device to connect the plurality of stator windings to each other though said at least one resistor.

9. The braking system of claim 8, wherein the AC/DC converter is connected to the at least one switch.

10. The braking system of claim 8, wherein the at least one resistor is connected between the AC/DC converter and the switching device.

11. The braking system of claim 8, wherein the switching device is comprised of an insulated gate bipolar transistor.

12. The braking system of claim 5 further comprising:
a speed sensor connected to at least one of the braking system and the generator;
wherein, the speed sensor is monitored by a control device, and the braking system is activated if an over-speed condition is detected, and wherein the control device provides an independent braking function, so that a signal from a main wind turbine controller is not required.

13. A braking system for a wind turbine, the wind turbine comprising a rotor, having at least one blade, a generator having a plurality of stator windings, the plurality of stator windings comprising a plurality of phases, and a frequency converter, the braking system comprising:
at least one current limiting device;
at least one switch connected to the frequency converter and between the plurality of stator windings of the generator and the at least one current limiting device, the at least one switch configurable in a first mode and a second mode, the first mode allowing power to flow from the generator to the frequency converter, and the second mode connecting the plurality of stator windings to each other via the at least one current limiting device, for slowing down movement or rotation of the rotor of the wind turbine;
a speed sensor connected to at least one of the braking system and the generator;
wherein, the speed sensor is monitored by a control device, and the braking system is activated if an over-speed condition is detected, and wherein the control device provides an independent braking function, so that a signal from a main wind turbine controller is not required.

14. The braking system of claim 13 wherein the at least one switch further comprises at least one of a rectifying device and an AC/DC converter.

15. The braking system of claim 14, further comprising:
at least one shunt;
a control device;
wherein, the control device controls the at least one switch to connect the plurality of stator windings to each other though the at least one shunt.

16. The braking system of claim 15, wherein the at least one shunt is comprised of one or more resistors.

* * * * *